(12) United States Patent
Wu

(10) Patent No.: US 7,336,849 B2
(45) Date of Patent: Feb. 26, 2008

(54) EXPOSURE CORRECTION METHOD FOR DIGITAL IMAGES

(75) Inventor: Shang-Yun Wu, Beijing (CN)

(73) Assignee: Destiny Technology Corporation, Taipei (TW)

( * ) Notice: Subject to any disclaimer, the term of this patent is extended or adjusted under 35 U.S.C. 154(b) by 685 days.

(21) Appl. No.: 10/844,332

(22) Filed: May 13, 2004

(65) Prior Publication Data
US 2005/0254723 A1    Nov. 17, 2005

(51) Int. Cl.
*G06K 9/40*    (2006.01)
(52) U.S. Cl. ..................................... 382/274
(58) Field of Classification Search ............... 382/274, 382/168, 261; 348/220.1; 700/104
See application file for complete search history.

(56) References Cited

U.S. PATENT DOCUMENTS

| | | | | |
|---|---|---|---|---|
| 5,224,177 A | * | 6/1993 | Doi et al. .................... | 382/168 |
| 5,283,746 A | * | 2/1994 | Cummings et al. ......... | 700/104 |
| 6,014,469 A | * | 1/2000 | Eschbach .................... | 382/261 |
| 6,094,219 A | * | 7/2000 | Roberts et al. .......... | 348/220.1 |

* cited by examiner

*Primary Examiner*—Samir Ahmed
*Assistant Examiner*—Tsung-Yin Tsai
(74) *Attorney, Agent, or Firm*—Harness, Dickey & Pierce, P.L.C.

(57) ABSTRACT

An exposure correction method for digital images first computes a gray-level histogram of an image. Then determine whether the exposure of the image is normal from the gray-level histogram, thereby determining an exposure threshold. The central region of the image is extracted to find an average brightness Iave. The average brightness Iave and a destination brightness Idest are used to determine an adjusting curve $y=f(x)$. The brightness channel is adjusted according to a constructed correspondence table. Therefore, the image processing effects are enhanced even though the processing time is reduced.

2 Claims, 5 Drawing Sheets

EXPOSURE CORRECTION METHOD FOR DIGITAL IMAGES

BACKGROUND OF THE INVENTION

1. Field of Invention

The invention relates to a digital image processing method and, in particular, to an exposure correction method for digital images.

2. Related Art

Due to the popularity of digital cameras and scanners, there are more chances for people to obtain digital images. However, such pictures sometimes do not have appropriate exposure. They are either over exposed (the images being too bright) or insufficiently exposed (the images being too dark). All these situations directly affect the visual effects of the images. Therefore, they have to be corrected in order to have better effects.

The exposure correction can increase or decrease the exposure amount of an image. More exposure gives a brighter image to reveal more details. Less exposure makes the image darker, rendering fewer details.

The conventional exposure correction method is performed in the RGB format. Since all channels are implemented using the method of Gamma Normalization, it thus takes a longer processing time. The conventional method uses the maximum and minimum of the brightness to determine the gamma curve and a luminance lookup table. The effect of such a processing method is not ideal.

Therefore, how to provide a digital image processing method to enhance the image processing effect while increasing the exposure correction speed is a problem to be solved in the field.

SUMMARY OF THE INVENTION

In view of the foregoing, the invention provides an exposure correction method for digital images. A primary objective of the invention is to perform rapid, automatic adjustments on pixels with abnormal exposure in order to obtain better effects on an image.

To achieve the objective, the invention provides an exposure correction method for digital images. First, an image is converted into a gray-level image. The gray-level histogram of the image is computed to determine whether the exposure of the image is correct. An exposure threshold Ratio_Threshold is thus determined. A central region of the image is extracted to compute the average brightness Iave. A destination brightness Idest is computed according to the averaged brightness Iave. An adjusting curve y=f(x) is then determined according to the averaged brightness Iave and the destination brightness Idest. A lookup table is constructed according to the adjusting curve y=f(x). The image is converted into the HIS (Hue, Saturation, Lightness) format and its brightness channel (I) is adjusted according to the lookup table.

According to the disclosed exposure correction method, the brightness of the central region is used to determine the adjusting curve, rendering better processing effects. Using the obtained lookup table, the brightness I channel in the HIS format is tuned. The invention reduces the processing time.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
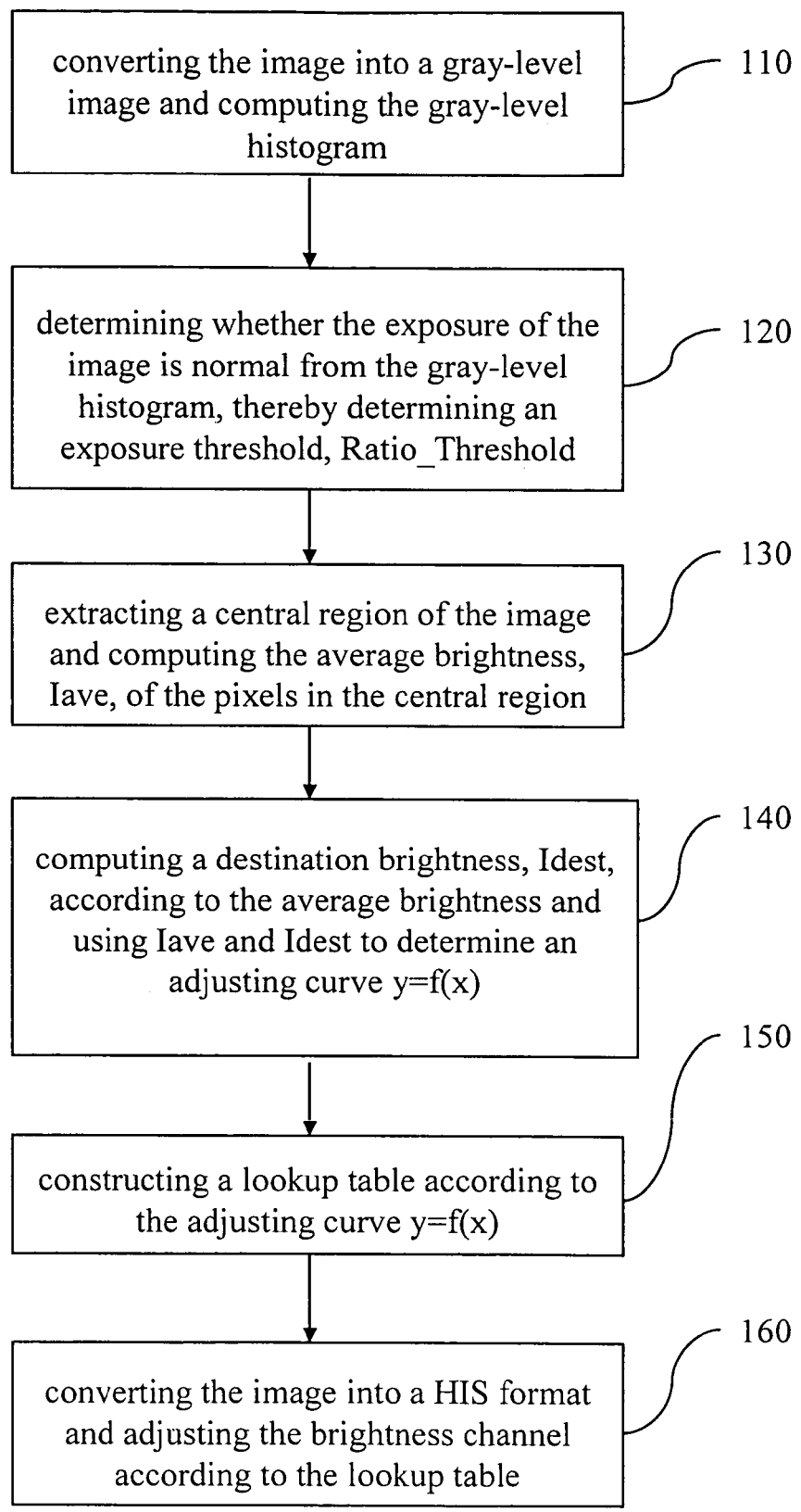
FIG. 1 is a flowchart of the disclosed exposure correction method for digital images.

The invention uses the curve adjustment method that utilizes the histogram of the brightness channel to conduct exposure correction. FIG. 1 is a flowchart of the disclosed exposure correction method for digital images.

The gray-level histogram is a function of the gray level, showing the statistical distribution of the gray levels (brightness) of all the pixels in an image. It indicates the number of pixels with a gray level in an image, reflecting the appearance frequency of each gray level. The horizontal axis from left to right represents the increasing gray level. The vertical axis represents the number of pixels in each gray level. If the image has L gray levels (usually L=256, namely 8-digit binary gray-level code), then the gray-level histogram of a pixel f(x,y) is Hist[I], where I=0, 1, . . . , 255.

Figure 2:
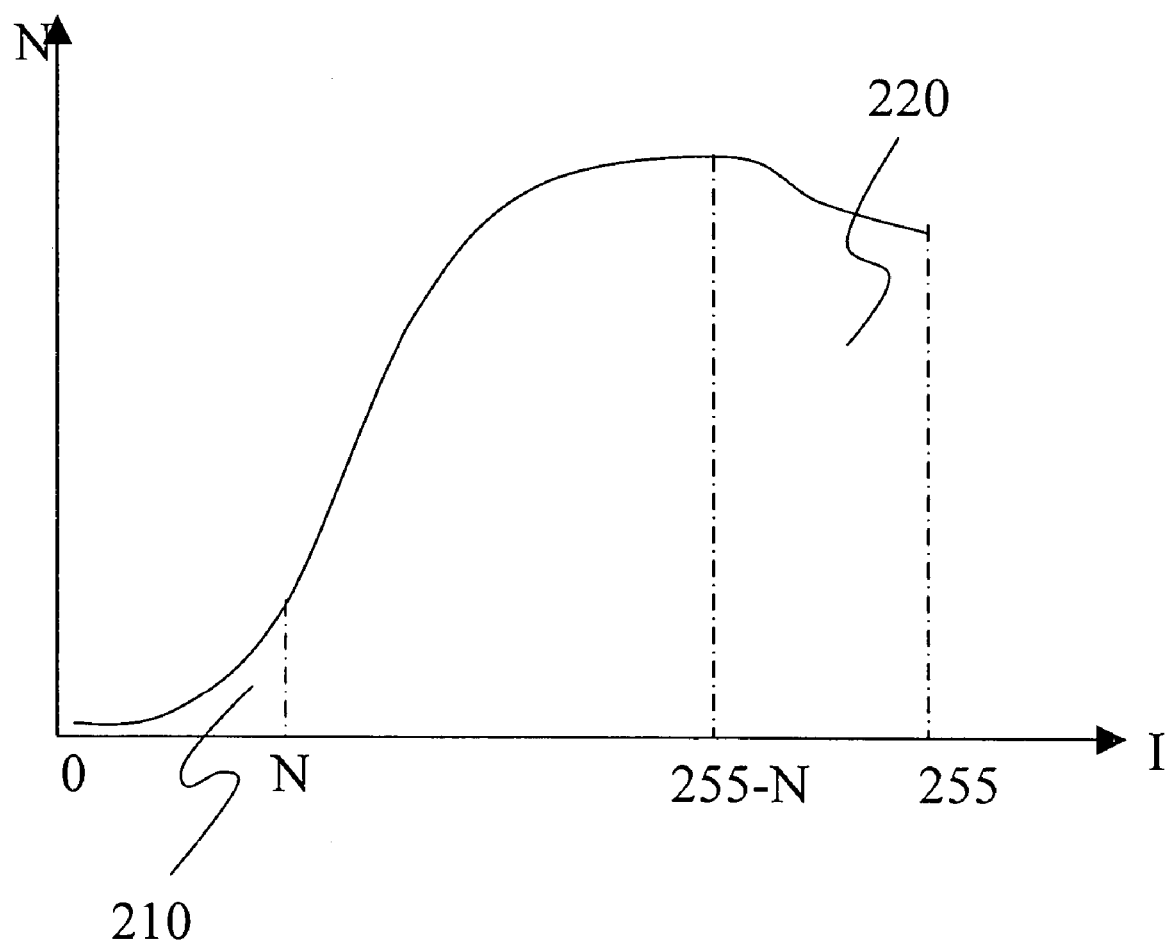
FIG. 2 is a schematic view of the low-level region and the high-level region in the histogram according to the invention.

Once the gray-level histogram is determined, it is used to determine whether the exposure of the image is normal. With reference to FIG. 2, the ratio of pixel numbers in the low-level region 210 and the high-level region 220 in the image, MinRatio/MaxRatio, is used to determine whether the exposure of the image is normal. The normal exposure ratio is NeedExposure_Ratio=20. If MinRatio/MaxRatio>NeedExposure_Ratio or MinRatio/MaxRatio<1/NeedExposure_Ratio, the exposure is abnormal; otherwise, the $$MinRatio = \sum_{k=0}^{N} Hist(k) \bigg/ \sum_{m=0}^{255} Hist(m)$$

exposure is all right. The pixel number in the low-level region 210 is computed using the formula:

The pixel number in the high-level region 220 is computed using the formula:

$$MaxRatio = \sum_{k=255-N}^{255} Hist(k) \bigg/ \sum_{m=0}^{255} Hist(m).$$

where k indicates the specific pixel in the low-level region 210 (namely, the first pixel, the second pixel, etc.), m indicates the specific pixel in the high-level region 220 (namely, the first pixel, the second pixel, etc.).

The condition to be satisfied is MinRatio/(N+1)>MinRatio_Threshold or MaxRatio/(N+1)<Minatio_Threshold, where N=4 and MinRatio_Threshold=2.0/255 here.

Whether the exposure of an image is normal is usd to determine the exposure threshold, Ratio_Threshold, of the image. When the exposure is not normal, Ratio_Threshold=0.3. When the exposure is normal, Ratio_Threshold=0.1.

Figure 3:
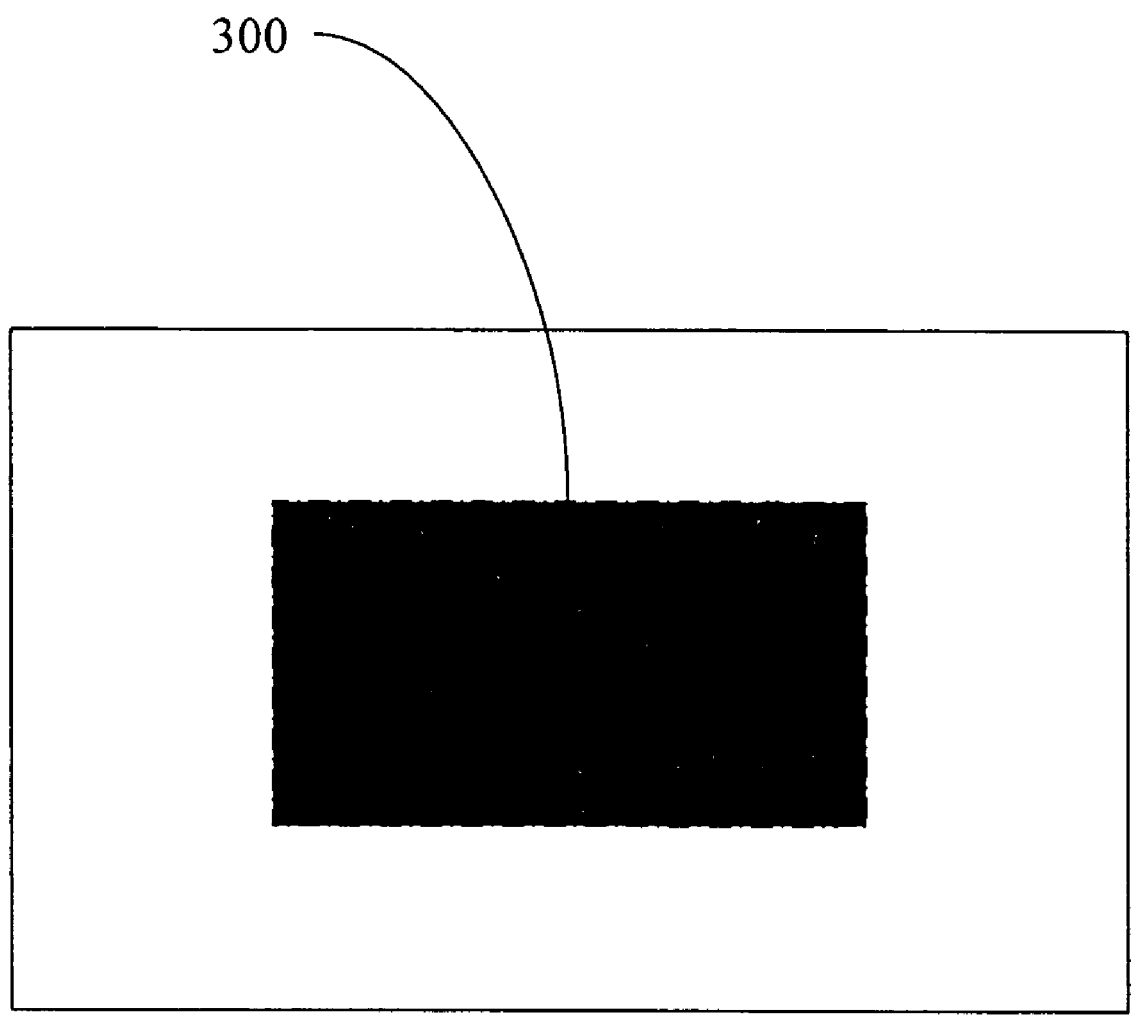
FIG. 3 is a schematic view of the central region in the invention.

Afterwards, the central region of the image is extracted. As shown in FIG. 3, the central region 300 is at the center of the image. Its length and width are such that its area is half of that of the whole image. The invention computes the average brightness Iave of the pixels in the central region 300. The average brightness Iave is used to adjust the destination brightness Idest. The process of determining the destination brightness Idest is as follows:

1. Preset a destination brightness Idest=150.
2. Compute two intermediate parameters Ibase and deltaI:
   when Iave<=128, Ibase=Iave;
   when Iave>128, Ibase=255-Iave; and
   deltaI=abs(Iave-Idest).
3. Update the destination brightness Idest.
   Set fCurRatio=deltaI/Ibase.
   If fCurRatio>Ratio_Threshold, then fCurRatio=Ratio_Threshold, wherein
   when Iave>Idest, Idest=Iave+fCurRatio*Ibase,
   when Iave<=Idest, Idest=Iave−fCurRatio*Ibase,
   from which the destination brightness Idest is obtained.
   Construct the curve y=f(x) passing through the points (0,0), (Iave Idest), and (255,255), where the curve y=f(x) monotonically increases from x=0 to 255 and is defined as:
   when Iave<Idest, f(x)=k*ln(a*x+1); and
   when Iave>Idest, f(x)=k*e(a*x)−k.

Once the values of the coefficients k and a are determined, f(x) is determined. The method of determining k and a are described in FIGS. 4a and 4b.

Figure 4A:
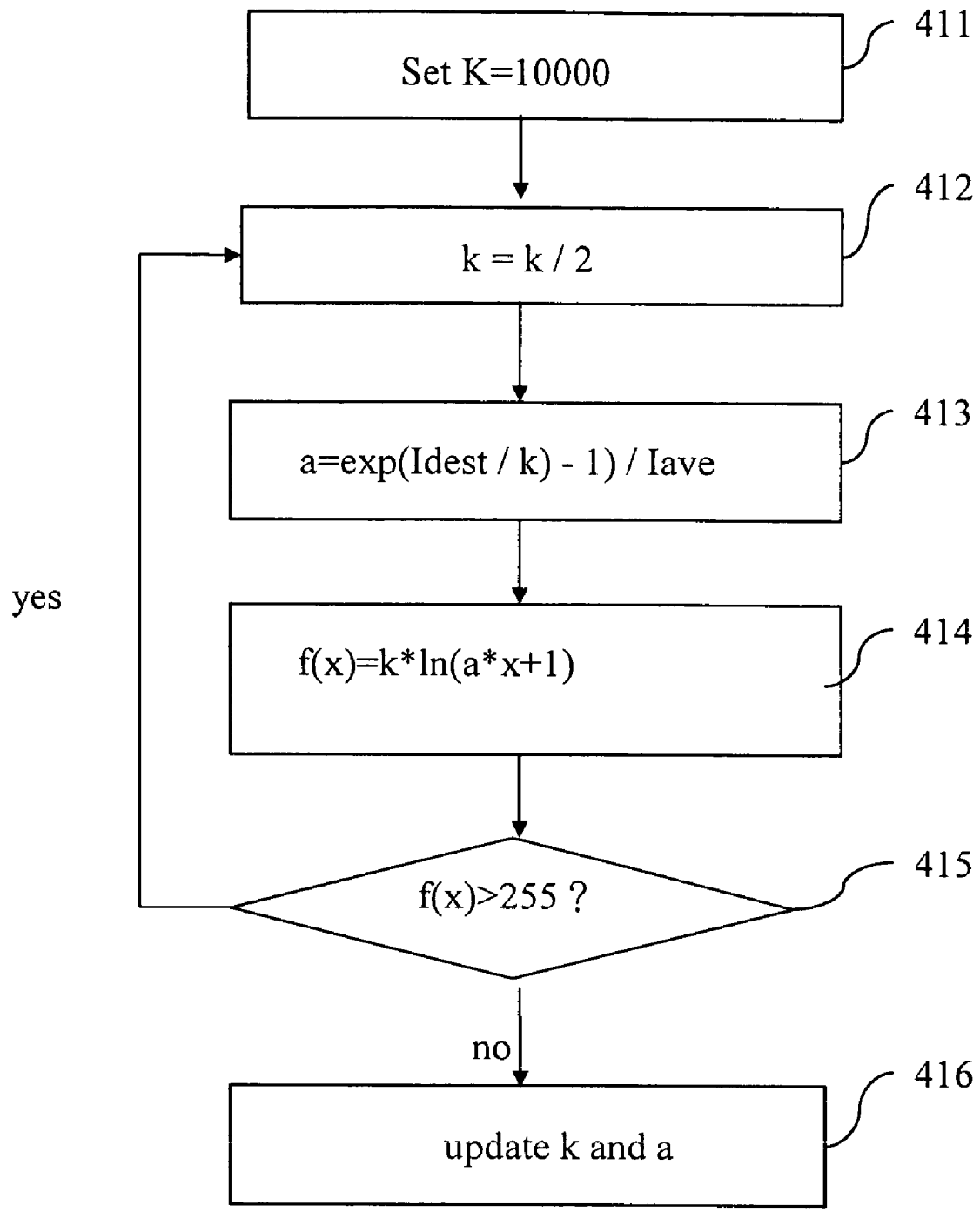
FIGS. 4a and 4b are flowcharts of computing the coefficients in the adjusting curve according to the invention.

When Iave<Idest, as in FIG. 4a, we set k=10000 (step 411) and k=k/2 (step 412). a is then computed from k using a=[exp(Idest/k)−1]/Iave (step 413). f(x) is constructed from k and a by f(x)=k*ln(a*x+1) (step 414). The value of f(x) is extracted (step 415). If f(x)>255, then the procedure returns to step 412 until f(x) is no greater than 255. At this moment, we set A(k)=[exp(Idest/k)−1]/Iave. When A(k)<255 and A(2k)>255, we use the dichotomy method to compute the coefficients k and a so that f(255)=k*ln(a*x+1)=255. The coefficients k and a are then updated (step 416).

Figure 4B:
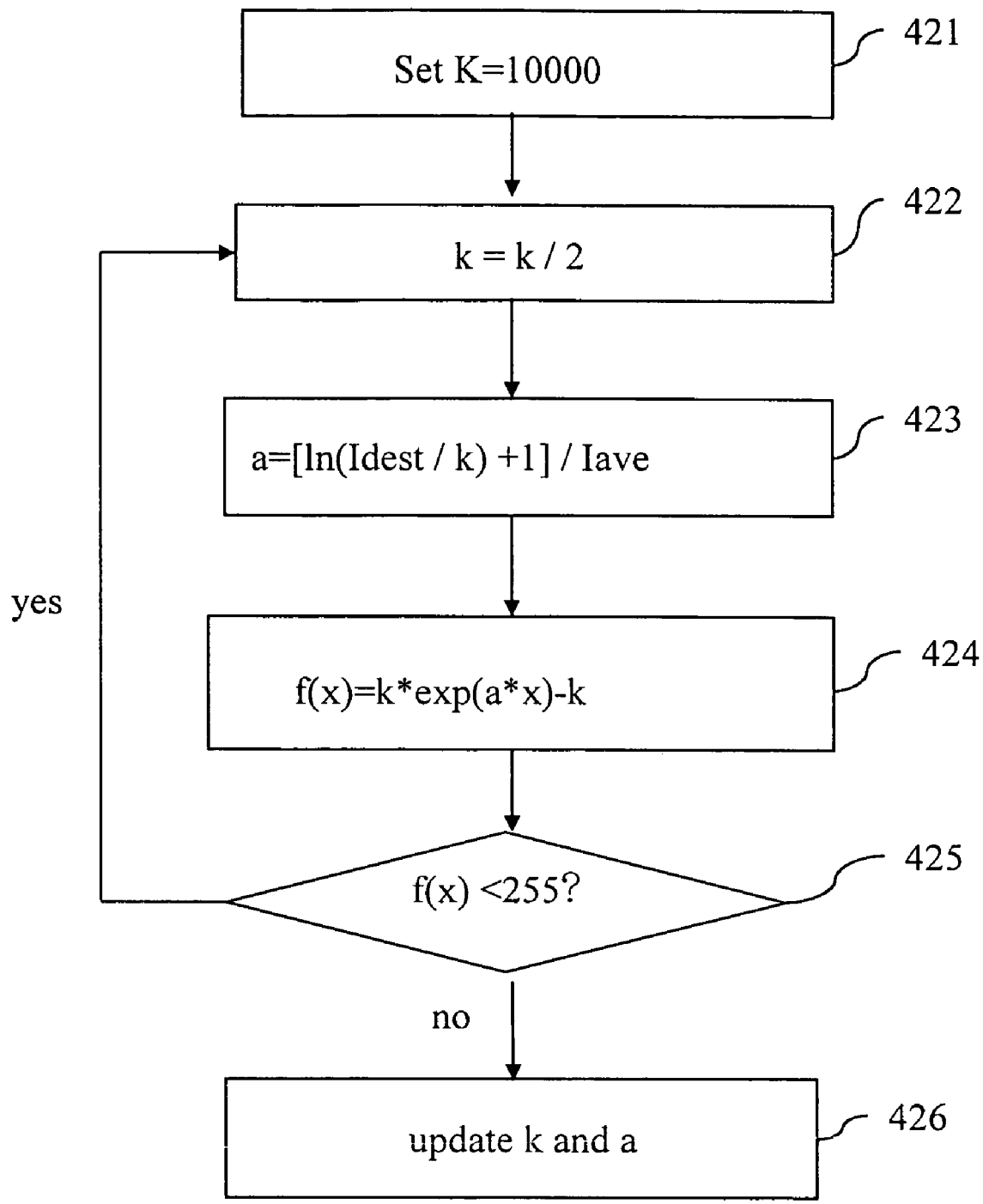

When Iave>Idest, the method of determining the coefficients k and a is shown in FIG. 4b. As shown in the drawing, we first set k=10000 (step 421) and then k=k/2 (step 422). a is then computed from k using a=[ln(Idest/k)+1]/Iave (step 423), thereby constructing f(x) using f(x)=k*exp(a*x)−k (step 424). The value of f(x) is extracted (step 425). If f(x)<255, the procedure returns to step 422 until f(x) is no smaller than 255. Then we set A(k)=[ln(Idest/k)+1]/Iave. If A(k)>255 and A(2k)<255 we us the dichotomy method to update the coefficients k and a (step 426) so that f(255)=k*exp(a*x)−k=255.

f(x) is then constructed from the coefficients k and a. A lookup table, Itbl[i], is constructed from f(x), where Itbl[i]=f(i) for i=0, 1, . . . , 255. The lookup table Itbl maps the brightness I channel, updating the brightness of the image. The updated brightness Inew=Itbl[I[i]], where I is the index of the pixel in the image. Finally, the HIS format of the image is converted into the RGB format.

In the following, we use an explicit image as an example to explain the invention. The data obtained from the gray-level histogram of the image are:
1507,268,703,1195,354,285,648,416,1252,537,1385,793, 236,1018,988,774,1276,672,1206, 1081,600,1408,1214, 638,3008,644,1532,1618,1611,1590,970,1782,780,780,596, 438,510,448,324,311,655,197,250,336,334,302,182,263, 336,205,261,227,220,219,171,221,235,162,313,157,190, 200,219,262,223,170,311,193,186,158,197,229,185,210, 211,245,176,161,180,173,239,146,180,191,187,144,135, 165,203,153,166,154,147,128,146,125,141,175,127,138, 130,119,102,141,125,145,129,131,123,123,104,125,92, 106,111,111,144,112,100,95,94,86,108,88,72,93,114,109, 88,122,124,92,126,124,129,80,122,93,113,88,133,105,88, 101,105,80,85,89,97,114,102,74,122,69,92,109,94,137,110, 87,107,110,132,127,87,89,221,89,115,128,139,159,126,111, 322,97,140,164,171,188,127,142,292,101,114,188,123,161, 131,140,198,204,92,95,104,75,115,118,107,241,102,129, 135,140,114,131,135,315,126,119,152,177,158,192,110, 438,129,91,162,121,172,84,92,247,274,72,92,99,93,43,61, 79,47,36,18,16,26,26,13,9,3,8,2,1,1,2,1,3,0,3,3,0,2,2,1,62, 121,42,149,119,35,68,114,96,149,79,295,199,76,194,303, 213,315,177,320,271,146,388,317,127,766,148,450,414, 430,418,241,515,202,223,159,101,91,73,46,42,65,28,36, 27,35,23,21,34,42,21,19,23,13,22,22,38,22,22,25,22,17,17, 19,21,29, 17,23,20,37,16,23,24,28,28,23,39,19,22,27,33,26, 21,23,18,28,17,20,24,30,31,25,27,24,18, 21,10,22,29,24,25, 16,26,18,33,26,18,22,23,25,12,23,20,17,23,25,17,24,18,26, 22,27,20,23, 19,20,11,18,24,16,23,17,18,26,22,33,29,26,25, 29.

The invention then uses the above data to determine whether the image is properly exposed. The ratio of the number of pixels in the low-level region, MinRatio, and the number of pixels in the high-level region, MaxRatio, is computed as:

$$MinRatio = \sum_{k=0}^{N} Hist(k) \Big/ \sum_{m=0}^{255} Hist(m)$$

$$MaxRatio = \sum_{k=255-N}^{255} Hist(k) \Big/ \sum_{m=0}^{255} Hist(m)$$

Set N=4 and obtain MinRatio=0.06 and MaxRatio=0.001.

Since 0.06/(4+1)>2.0/255 and MinRatio/MaxRatio=0.06/0.001=60>20, therefore, the image is not properly exposed and Ratio_Threshold=0.3.

The central region of the image is extracted to obtain its average brightnes Iave=89. Since Iave<=128, thus Ibase=89, from which we obtain deltaI=abs(Iave−Idest)=abs(89−150)=61, where Idest=150 is the predetermined value. The destination brightness Idest is then updated:

fCurRatio=deltaI/Ibase=61/89=0.69.

Since fCurRatio=0.69>Ratio_Threshold=0.3, we have fCurRatio=Ratio_Threshold=0.3.

Moreover, Iave=89<Idest=150, therefore, Idest=Iave−fCurRatio*Ibase=89−89*0.3=63.

Afterwards, the invention determines the curve y=f(x). First set k=10000. Since Iave<Idest, we have a=[exp(63/k)−1]/89. Thereofre, f(x)=k*ln(a*x+1). If f(x)>255, we have k=k/2 and obtains the value of k.

A(k)=[exp(63/k)−1]/89. When A(k)<255 and A(2k)>255, the dichotomy is used to compute the coefficients k and a so that f(255)=k*ln(a*x+1)=255, from which we obtain the value of a.

The lookup table is constructed to convert the image into the HIS format, using the lookup table to map the I channel. After mapping all the pixels, the image is converted to the RGB format.

Certain variations would be apparent to those skilled in the art, which variations are considered within the spirit and scope of the claimed invention.

What is claimed is:

1. An exposure correction method for a digital image comprising:

converting the image into a gray-level image and computing the gray-level histogram thereof;

determining whether the exposure of the image is normal from the gray-level histogram, thereby determining an exposure threshold, Ratio-Threshold;

extracting a central region of the image and computing the average brightness, Iave, of the pixels in the central region;

computing a destination brightness, Idest, according to the average brightness and using Iave and Idest to determine an adjusting curve y=f(x);

construting a lookup table according to the adjusting curve y=f(x); and converting the image into a HSI (Hue, Saturation, Lightness) format;

wherein the adjusting curve f(x) has the expression:

$f(x)=k*\ln(a*x+1)$ when $I\text{ave}<I\text{dest}$; and $f(x)=k*e(a*x)-k$ when $I\text{ave}>I\text{dest}$.

2. The method of claim 1, wherein the coefficients k and a are computed using the dichotomy method.

* * * * *